May 24, 1949.  D. H. WAARA  2,471,254

MOLDING CLIP

Filed July 17, 1946

INVENTOR.
DAVID H. WAARA
BY
ATTORNEY

Patented May 24, 1949

2,471,254

UNITED STATES PATENT OFFICE 2,471,254

MOLDING CLIP

David H. Waara, Detroit, Mich., assignor to Robert L. Brown, Ferndale, Mich.

Application July 17, 1946, Serial No. 684,223

5 Claims. (Cl. 85—5)

This invention relates to a fastener and more particularly to a stamped sheet metal fastener for insertion in an opening for securing finished objects to supporting surfaces.

A primary object of the invention is to provide a spring fastening device which is designed to secure a molding or other decorative part to a supporting member through an aperture in the supporting member.

Another object of the invention is to provide a stamped sheet metal fastener for insertion into an aperture in the supporting member and a stamped sheet metal locking member which cooperates between the supporting member and the fastener.

A further object of the invention is to provide spring arms struck from the locking member to hold the locking member in position and provide means for closing the aperture.

A still further object of the invention is to provide spring arms struck from the body of the fastener to receive a hollow molding with spaced inwardly turned flanges, the spring arms being so formed as to hold the molding or other decorative part securely to the supporting member.

Other objects and advantages of the invention will more fully appear from the following description taken in connection with the accompanying drawings, in which.

Figure 1:
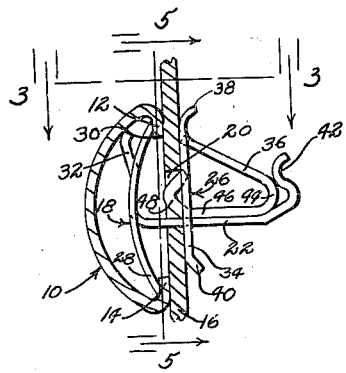
Fig. 1 illustrates an improved molding fastener in fastened position to a supporting member; the fastener being shown in side elevation with the supporting member and applied molding in section.

Referring to the drawings, 10 represents a hollow molding or trim strip provided with the usual spaced inwardly turned flanges 12 and 14 which is to be mounted on an apertured support 16. Preparatory to the assembly of the molding on the supporting surface, formed fasteners 18 are inserted in the molding between the inwardly turned flanges 12 and 14. The fasteners 18 are positioned in spaced relation relative to the apertures 20 and are applied to the supporting surface 16. Each fastener 18 is so formed as to permit a locking member 26 to be forced between a portion of the fastener 18 and the supporting member 16, thereby holding the fastener 18 securely in position.

Figure 3:
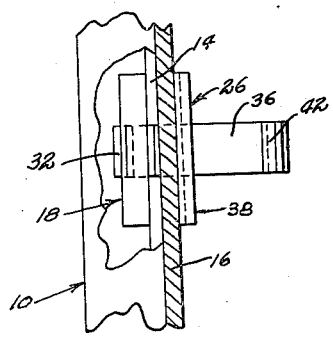
Fig. 3 is a sectional view taken on line 3—3 of Fig. 1.
Figure 5:
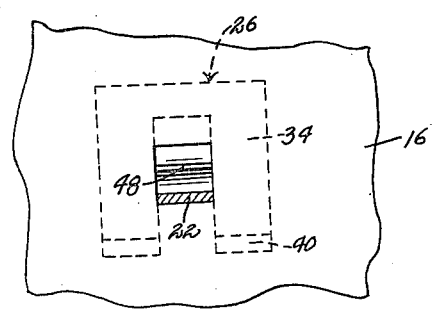
Fig. 5 is a sectional view taken on line 5—5 of Fig. 1.

Referring to the form of the invention shown in Figs. 1, 3 and 5, the fastener 18 comprises a one piece sheet metal stamping, preferably of spring steel, having a base 28 of arcuate form. The center portion of one end of the base 28 is struck out at an acute angle forming an arm 32 which cooperates with the underside of the molding 10 to hold the fastener firmly in alignment with the aperture in the supporting member 16, to which the molding is to be applied.

The center of the opposite end of the base portion 28 of the fastener 18 is struck out to form an arm 22 which is to be inserted in the aperture 20 of the supporting member 16. The end of the arm 22 is bent upwardly in the form of the letter S. The upper half forms a resilient locking finger 42 to form a snap receiver for the locking member 26.

The locking member 26 comprises a one piece sheet metal stamping, preferably of spring steel, having a base 34 and outwardly turned ends 38 and 40 to facilitate its sliding across the surface of the supporting member 16, the base 34 resting against the supporting member 16 when the locking member 26 is in the locked position. The center portion of the base 34 is struck outwardly to form an arm 36 leaving the base 34 substantially in the shape of the letter U. The arm 36 being bent at an obtuse angle 44 forms a positive locking arm to be forced past the resilient locking finger 42. A portion 46 of the arm 36 extends along the arm 22 of the fastener 18 from the obtuse angle 44, and having an upturned spring finger 48 substantially in the form of the letter V, closing the aperture so that water, sand, or other foreign matter may not enter.

In the assembly of the device, the fasteners 18 are inserted in the hollow molding with the ends of the base 28 and 30 resting against the spaced, inwardly turned flanges 12 and 14. The spring arm 32, pressing against the body of the molding, furnishes tension to hold the fastener securely in place but yet allows the fastener to be positioned relative to the apertures 20 in the supporting member 16. The arms 22 of the fasteners 18 are then freely inserted through the apertures 20 of the supporting member 16 with the outer surfaces of the arms 22 resting upon the edges of the apertures 20. The locking members 26 are pressed over the arms 22 on the reverse side of the supporting member 16 from that which the molding is fastened. The locking members 26 are pressed until the obtuse angles 44 of the arms 36 have snapped past the resilient locking fingers 42 and the upturned ends 48 of arms 46 have closed the apertures 20. The fasteners 18 are now securely locked in the desired position and the apertures 20 are sealed. The molding 10 is held firmly to the supporting member 16.

Figure 2:
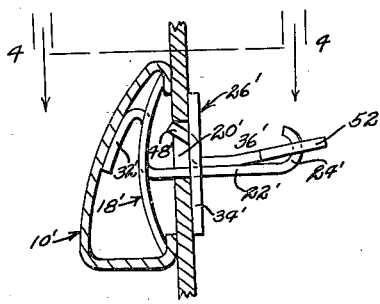
Fig. 2 illustrates a modified form of the invention showing the fastener in side elevation with the supporting member and applied molding in section.
Figure 4:
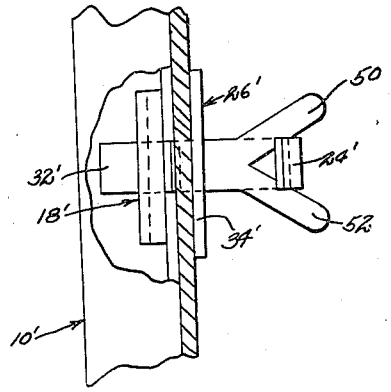
Fig. 4 is a sectional view taken on line 4—4 of Fig. 2.

Referring to a modified form of the invention, Figs. 2 and 4, the arm 32' of the fastener 18' is struck out at an obtuse angle to contact the molding 10' and hold it securely in place; the end 24' of the arm 22' is bent upwardly in an arcuate form to provide a resilient locking finger. The locking member 26' has a base 34' from one end of which an arm 36' is struck. The arm 36' is bifurcated at its end forming fingers 50 and 52 to provide a positive locking means in cooperation with resilient locking finger 24'. From the opposite end of the base 34' is struck a resilient arm 48' which snaps into aperture 20' closing the opening so that foreign matter may not enter.

After the fastener 18' has been secured in the molding 10' by the described means, the arm 22' is inserted through the aperture 20'. The locking member 26' is pressed over the arm 22' until the bifurcated end snaps over the resilient locking finger 24' and the resilient arm 48' snaps into the aperture 20' locking the fastener 18' securely in the desired position.

Figure 6:
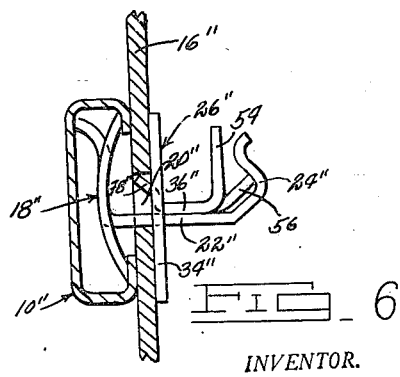
Fig. 6 is a view corresponding to Fig. 1 but showing a further modified form of the invention.

Referring to another modified form of the invention, Fig. 6, the fastener 18'' is substantially the same as that shown in Figs. 1, 3 and 5. The locking member 26'' comprises a base 34'' from which is struck an arm 36'', the outer end of which is bent upward to provide an arm 54, which may be used in cooperation with a tool for forcing the locking member 26'' into the locked position, or for unlocking the locking member 26'' from the locked position. From the arm 54 is struck a resilient finger 56 which snaps past resilient locking finger 24'' to provide a positive locking means for the fastener 18''. A resilient arm 48'' is struck from the opposite end of the base 34'' to snap into the aperture 20'' closing the aperture to all foreign matter.

After the fastener 18'' has been secured in the molding 10'' by the described means, the arm 22'' is inserted through the aperture 20''. The locking member 26'' is pressed over the arm 22'' until the resilient finger 56 snaps past the resilient locking finger 24'' and the resilient arm 48'' snaps into the aperture 20'' locking the fastener 18'' securely in the desired position.

While the two interengaging members have been described as being secured together by a snap on action and being preferably of resilient material, it is to be understood that the parts may be secured together by bending or expanding such as, by bending the locking finger 42 over the arm 36, bending the locking finger 24' between the fingers 50 and 52 or bending the locking finger 24'' over the finger 56.

The device has been illustrated in a preferred form of the invention but it will be understood that various changes including the size, shape, and arrangement of parts may be made without departing from the spirit of my invention and it is not my intention to limit its scope other than by the terms of the appended claims.

I claim:

1. A sheet metal fastening device comprising a fastener and a locking member, said fastener comprising a concave body portion the ends of which are adapted to engage the inwardly turned flanges of a hollow molding, an arm struck from said body portion for engagement with the underside of the molding, a second arm struck from said body portion in a direction opposite to said first named arm with an upturned resilient locking finger at its outer end, said second arm being adapted to be inserted through an aperture of a supporting member, said locking member comprising a base portion having means struck from the body thereof cooperating with said locking finger of said fastener and the aperture of the supporting member to lock said fastener in position and close the aperture of the supporting member, said locking member being pressed over said second arm of said fastener between resilient locking finger and the supporting member.

2. A sheet metal fastening device comprising a fastener and a locking member, said fastener comprising a concave body portion the ends of which are adapted to engage the inwardly turned flanges of a hollow molding, an arm struck from said body portion for engagement with the underside of the molding, a second arm struck from said body portion in a direction opposite to said first named arm with an upturned resilient locking finger substantially in the form of the letter S at its outer end, said second arm being adapted to be inserted through an aperture of a supporting member, said locking member comprising a base portion having an arm struck outwardly from the body thereof, said arm being reversely bent inwardly forming a positive locking means in cooperation with said resilient locking finger at its bent end and a resilient locking portion at its free end for frictional engagement with the edges of the aperture in the supporting member and closing same, said locking member being pressed over said second arm of said fastener, between said resilient locking finger and the supporting member.

3. A sheet metal fastening device comprising a fastener and a locking member, said fastener comprising a concave body portion the ends of which are adapted to engage the inwardly turned flanges of a hollow molding, an arm struck from said body portion for engagement with the underside of the molding, a second arm struck from said body portion in a direction opposite to said first named arm with an upturned resilient locking finger substantially in the form of the letter S at its outer end, said second arm being adapted to be inserted through an aperture of a supporting member, said locking member comprising a base portion having an arm struck outwardly from the body thereof, said arm being bent upwardly along a portion of its length to form an arm for cooperation with a tool to place the locking member in the locked position, a resilient finger struck from said upwardly extending arm adapted to snap past said resilient locking finger of said fastener, forming a positive locking means in cooperation with a second resilient finger struck from said base portion for frictional engagement with the edges of the aperture in the supporting member and closing same, said locking member being pressed over said second arm of said fastener, between said resilient locking finger and the supporting member.

4. A sheet metal fastening device comprising a fastener and a locking member, said fastener comprising a concave body portion the ends of which are adapted to engage the inwardly turned flanges of a hollow molding, an arm struck from said body portion for engagement with the underside of the molding, a second arm struck from said body portion in a direction opposite to said first named arm with an upturned resilient locking finger in an arcuate form at its outer end, said second arm being adapted for insertion through an aperture of a supporting member, said locking member comprising a base portion having an arm struck outwardly from the body thereof, said arm being bent upwardly at an acute angle and having its outer end bifurcated to snap over said resilient locking finger of said fastener, forming a positive locking means in co-operation with a second resilient finger struck from said base portion for frictional engagement with the edges of the aperture in the supporting member and closing same, said locking member being pressed over said second arm of said fastener between said resilient locking finger and the supporting member.

5. A sheet metal fastening device comprising a fastener and a locking member, said fastener comprising a body portion, the ends of which are adapted to engage inwardly turned flanges of a hollow molding at one side of a supporting member, an arm struck from the body portion of said fastener for projecting through an opening in the supporting member, a turned end portion at the outer end of said arm extending beyond the opposite side of the supporting member to which the molding is received, said locking member comprising a plate like member for closing the opening in the supporting member pinched between the supporting member and the turned end portion of said fastener.

DAVID H. WAARA.

No references cited.